UNITED STATES PATENT OFFICE.

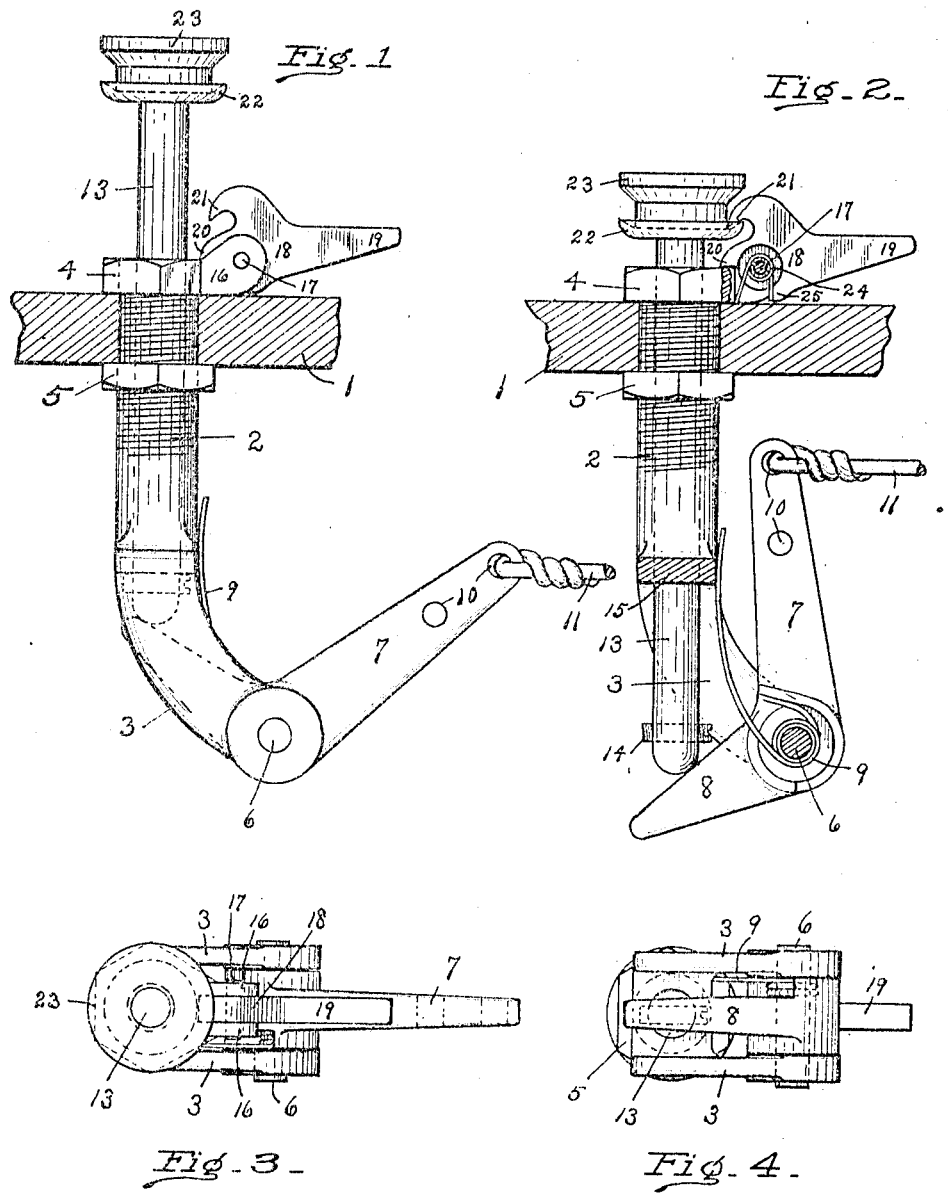

EMMET P. GRAY, OF DETROIT, MICHIGAN.

LOCKING AND RELEASING DEVICE.

1,035,182.  Specification of Letters Patent. Patented Aug. 13, 1912.

Application filed July 10, 1911. Serial No. 637,620.

*To all whom it may concern:*

Be it known that I, EMMET P. GRAY, a citizen of the United States, and a resident of Detroit, in the county of Wayne and State of Michigan, have invented a new and useful Locking and Releasing Device, of which the following is a specification.

This invention relates to spring actuated arms and latches to lock the arms in one of a plurality of positions and to release the same, and its object is to provide a construction especially adapted for quickly opening or closing ports, gates or valves, or for quickly actuating other movable elements.

The invention may be embodied in a bracket, an arm pivoted thereon, a plunger or slidable bar adapted to move the arm in one direction, a spring to move the arm in the opposite direction, and a latch to lock the bar and arm and to release the same.

In the accompanying drawing, Figure 1 is a side elevation of the entire mechanism in released position. Fig. 2 is a similar elevation with the arm and sliding bar locked, part of the frame being broken away to show the springs. Fig. 3 is a plan of the device in Fig. 1. Fig. 4 is a bottom view of the parts when in the position shown in Fig. 2.

Similar reference characters refer to like parts throughout the several views.

In the motor installation of automobiles and launches, it is often desirable to quickly open or close a gate or valve situated at some distance from the operator, or to open or close an electric circuit, and this without removing the hands from the steering wheel or other controlling mechanism. This may be accomplished by the mechanism illustrated in the accompanying drawing, wherein is shown a support 1, which may be the floor of a car or launch, or any other proper device. The bracket is in the form of a tubular body 2 having arms 3, and threaded to receive the nuts 4 and 5, which nuts may be screwed hard against the support 1. On a pin 6, at the ends of the arms 3, is pivoted a bell-crank lever having arms 7 and 8, and whose hub may be counter-bored to receive the spring 9, which spring normally tends to swing the arm 7 to the position shown in Fig. 1. This arm may have holes 10 into which may be secured a stiff wire-rod 11, the opposite end of which may connect to the parts to be actuated.

Slidable in the body 2 is a rod 13, having any proper device at its lower end to prevent the rod from sliding up too far. In the drawing, a screw-pin 14 is shown, which pin may contact with the shoulder 15 between the inner ends of the arms 3. On the nut 4, the arms 16 may be formed, which arms carry the pin 17 which forms a pivot for the latch 18. This latch has an operating arm 19, a shoulder 20 to engage the nut 4, a hook 21 to engage the flange 22 of the button 23, and a counter-bore for the spring 24. This spring has one end engaging the nut and another engaging a small shoulder 25 on the latch, and normally holds the latch in the position shown in the drawings. The collar 22 has its lower face beveled so that when the rod 13 is depressed, the hook 21 will be forced outward, and a beveled or cup-shaped upper surface so that the hook will not freely disengage because of shocks and jars.

When it is desired to swing the arm 7 inward, the button 23 is depressed, which may be done by hand or foot, until the flange 22 is below the hook 21, which hook will hold the parts as shown in Fig. 2. Simply depressing the arm 19 by hand or foot releases the knob and permits the spring 9 to swing the arm 7 outward.

It should be understood that the connector 11 may be flexible, if desired, and that while this device is especially designed for opening fuel valves, air valves and muffler cut-outs of internal-combustion engines, its use is not limited to such service.

It is evident that the latch 18 may be omitted and the position of the arm 7 controlled by the movement of the rod 13, which rod may be pushed down by the foot of the operator and returned by the spring 9. Such construction is desirable for controlling the opening of the air-inlet valve of certain types of internal combustion engines and of the muffler cut-outs of others.

Having now explained my construction, what I claim as my invention and desire to secure by Letters Patent is:—

1. In a locking and releasing device, the combination of a bracket having a tubular body, a nut on said tubular body to secure the same in position, a rod slidably mounted in said body and having a flange at its upper end, a latch mounted at one end of the bracket on said nut and comprising an operating arm and a hook to engage the flange, a spring to position the latch, a bell-crank lever pivoted to the opposite end of the bracket and having one arm engaged by the rod, and a spring to normally hold the other arm of the lever outward.

2. In a locking and releasing device, the combination of a bracket having a tubular body, nuts on said tubular body to secure the same in position, a rod slidably mounted in said body, a button on the outer end of the rod having a beveled flange, a latch mounted at one end of the bracket on one of the nuts and comprising an operating arm and a hook to engage the flange, a spring to position the latch, a bell-crank lever pivoted to the opposite end of the bracket and having one arm engaged by the inner end of the rod, and a spring to normally hold the other arm of the lever outward.

In testimony whereof I have signed this specification in the presence of two subscribing witnesses.

EMMET P. GRAY.

Witnesses:
EDWARD N. PAGELSEN,
ELIZABETH M. BROWN.